(12) United States Patent
Zhou et al.

(10) Patent No.: US 12,716,704 B2
(45) Date of Patent: Aug. 25, 2026

(54) DETECTION DEVICE AND WELDING QUALITY INSPECTION SYSTEM

(71) Applicants: Tyco Electronics (Dongguan) Ltd., Dongguan City (CN); TE Connectivity Solutions GmbH, Schaffhausen (CH); Tyco Electronics (Shanghai) Co., Ltd., Shanghai (CN)

(72) Inventors: Lei (Alex) Zhou, Shanghai (CN); Dandan (Emily) Zhang, Shanghai (CN); Roberto Francisco-Yi Lu, Bellevue, WA (US); Xuyan Yu, Dongguan (CN); Haoquan Yao, Dongguan (CN); Hongzhou (Andy) Shen, Dongguan (CN); Yi Li, Dongguan (CN)

(73) Assignees: Tyco Electronics (Shanghai) Co., Ltd., Shanghai (CN); Tyco Electronics (Dongguan) Ltd., Dongguan (CN); TE Connectivity Solutions GmbH, Schaffhausen (CH)

( * ) Notice: Subject to any disclaimer, the term of this patent is extended or adjusted under 35 U.S.C. 154(b) by 412 days.

(21) Appl. No.: 18/477,720

(22) Filed: Sep. 29, 2023

(65) Prior Publication Data

US 2024/0110776 A1 Apr. 4, 2024

(30) Foreign Application Priority Data

Sep. 29, 2022 (CN) ......................... 202211202238.3

(51) Int. Cl.
*G01B 5/00* (2006.01)
*G01B 5/06* (2006.01)

(52) U.S. Cl.
CPC ........... *G01B 5/0037* (2013.01); *G01B 5/061* (2013.01)

(58) Field of Classification Search
CPC ........ G01B 5/0037; G01B 5/061; G01V 8/10; G01V 1/001
See application file for complete search history.

(56) References Cited

U.S. PATENT DOCUMENTS 4,270,275 A * 6/1981 McMurtry ............ G01B 7/002 33/561
5,191,720 A * 3/1993 Miura ...................... G01B 5/08 33/783
11,135,721 B2 * 10/2021 Bryner ................... B25J 9/1664
11,633,813 B2 * 4/2023 Wang .................. B23K 9/0953 219/74
11,860,082 B1 * 1/2024 Bellemare ............ G01B 5/0037
(Continued)

*Primary Examiner* — Peter J Macchiarolo
*Assistant Examiner* — Anna Josephine Saunders
(74) *Attorney, Agent, or Firm* — Barley Snyder

(57) ABSTRACT

A detection device adapted to verify or determine a welding quality includes a housing, a moving assembly, a mounting bracket, and a rotating assembly. The moving assembly is movably installed on the housing and is adapted to be moved up and down in a vertical direction. The mounting bracket is fixed to the housing. The rotating assembly includes a rotating member rotatably connected to the mounting bracket and movably connected to the moving assembly, and a contact probe fixed to the rotating member. The contact probe is adapted to make sliding contact with a second component welded on a first component and to push the moving assembly to move in the vertical direction through the rotating member.

20 Claims, 5 Drawing Sheets

(56) References Cited

U.S. PATENT DOCUMENTS 12,141,958 B2 * 11/2024 Naruse .................... G06T 7/74
2017/0038615 A1 * 2/2017 Liu .................... G01B 21/02
2017/0227344 A1 * 8/2017 Rettig .................. G01B 5/0037
2017/0248415 A1 * 8/2017 Matsumiya ........ G01B 11/2441
2022/0028106 A1 * 1/2022 Jacot .................... G06T 7/70
2022/0341892 A1 * 10/2022 David .................... G01N 29/07
2023/0139733 A1 * 5/2023 Mo .................... G01N 33/207
702/166
2025/0067698 A1 * 2/2025 Lee .................... H01M 10/48

* cited by examiner

DETECTION DEVICE AND WELDING QUALITY INSPECTION SYSTEM

CROSS-REFERENCE TO RELATED APPLICATION

This application claims the benefit of Chinese Patent Application No. CN202211202238.3 filed on Sep. 29, 2022, in the State Intellectual Property Office of China, the whole disclosure of which is incorporated herein by reference.

FIELD OF THE INVENTION

The present invention relates to a detection device for welding quality inspection and a welding quality inspection system including the detection device.

BACKGROUND

Inspection of soldering and other forms of welding is typically performed manually. However, manual inspection is time-consuming and labor-intensive, with very low efficiency. As a result, these inspection processes significantly reduce the production efficiency of automated production lines.

SUMMARY

According to an embodiment of the present disclosure, a detection device adapted to check a welding quality includes a housing, a moving assembly, a mounting bracket, and a rotating assembly. The moving assembly is movably installed on the housing and is adapted to be moved up and down in a vertical direction. The mounting bracket is fixed to the housing. The rotating assembly includes a rotating member rotatably connected to the mounting bracket and movably connected to the moving assembly, and a contact probe fixed to the rotating member. The contact probe is adapted to make sliding contact with a second component welded on a first component and to push the moving assembly to move in the vertical direction through the rotating member.

BRIEF DESCRIPTION OF THE DRAWINGS

The invention will now be described by way of example with reference to the accompanying Figures, of which.

DETAILED DESCRIPTION OF THE EMBODIMENTS

Figure 1:
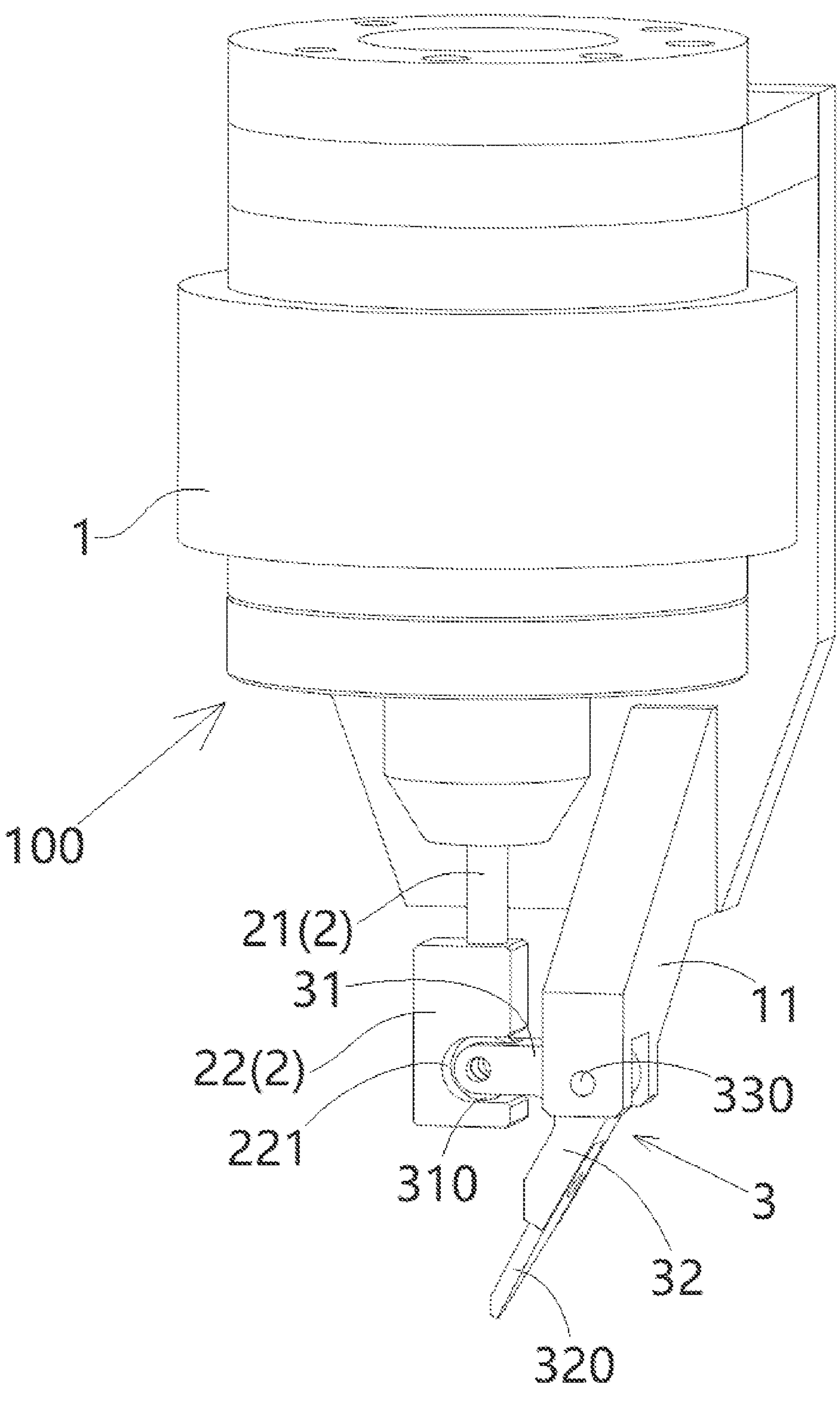
FIG. 1 is an illustrative perspective view of a detection device according to an exemplary embodiment of the present invention.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

According to one embodiment of the present disclosure, a detection device adapted to check, determine, or inspect a welding quality includes a housing, a moving assembly which is movably installed on the housing and is capable of being moved up and down in a vertical direction, a mounting bracket fixed to the housing, and a rotating assembly. The rotating assembly includes a rotating member rotatably connected to the mounting bracket and movably connected to the moving assembly, and a contact probe fixed to the rotating member. The contact probe is adapted to slidingly contact a second component welded on a first component and to push the moving assembly to move in the vertical direction through the rotating member.

According to another embodiment, a welding quality inspection system includes the above detection device, and a welding quality judgment device. The judgment device is adapted to determine whether the welding quality of a second component welded on a first component is qualified based on the movement distance of the moving assembly in the vertical direction.

Figure 2:
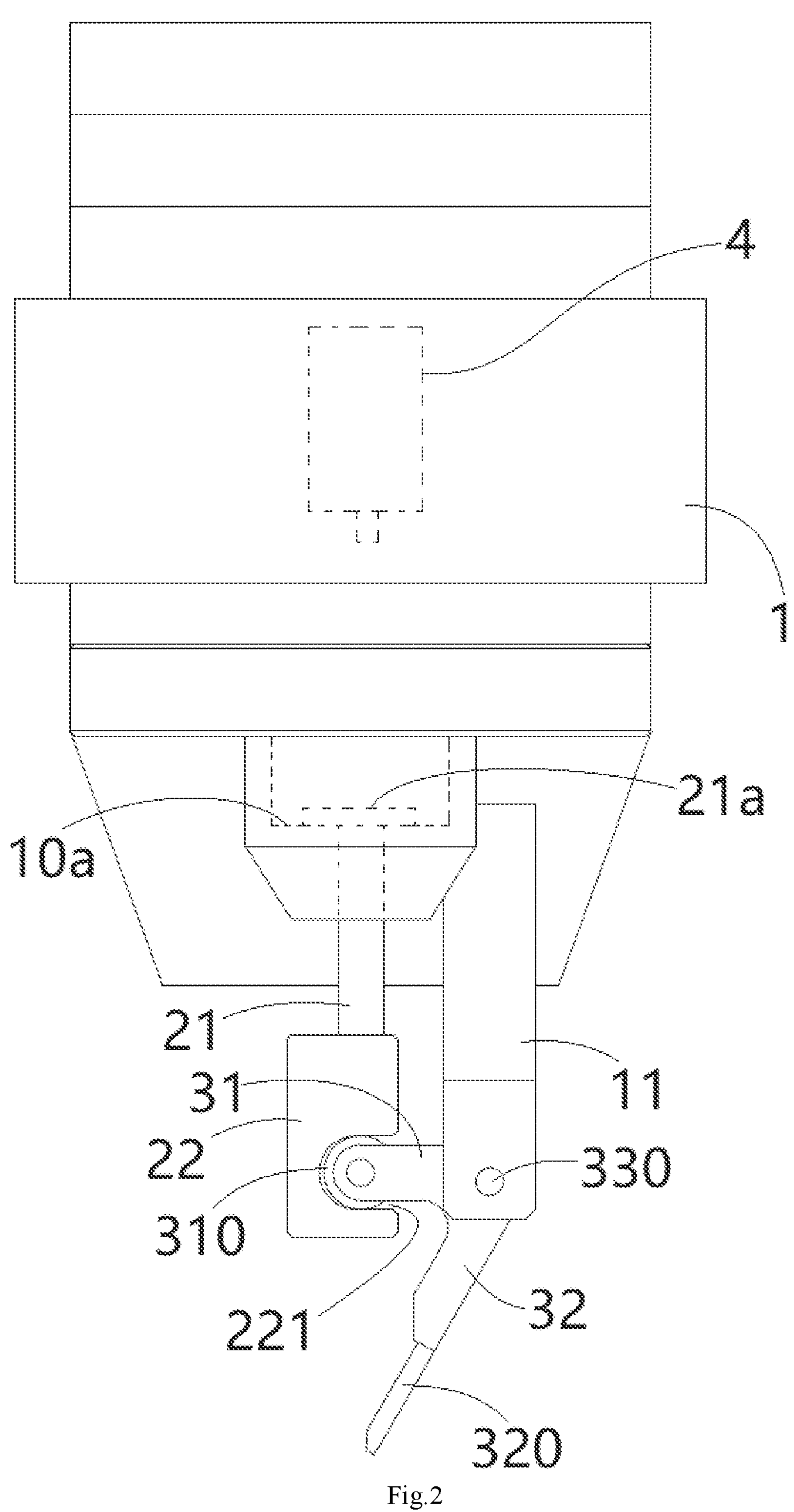
FIG. 2 is a plan view of a detection device according to an exemplary embodiment of the present invention.
Figure 3:
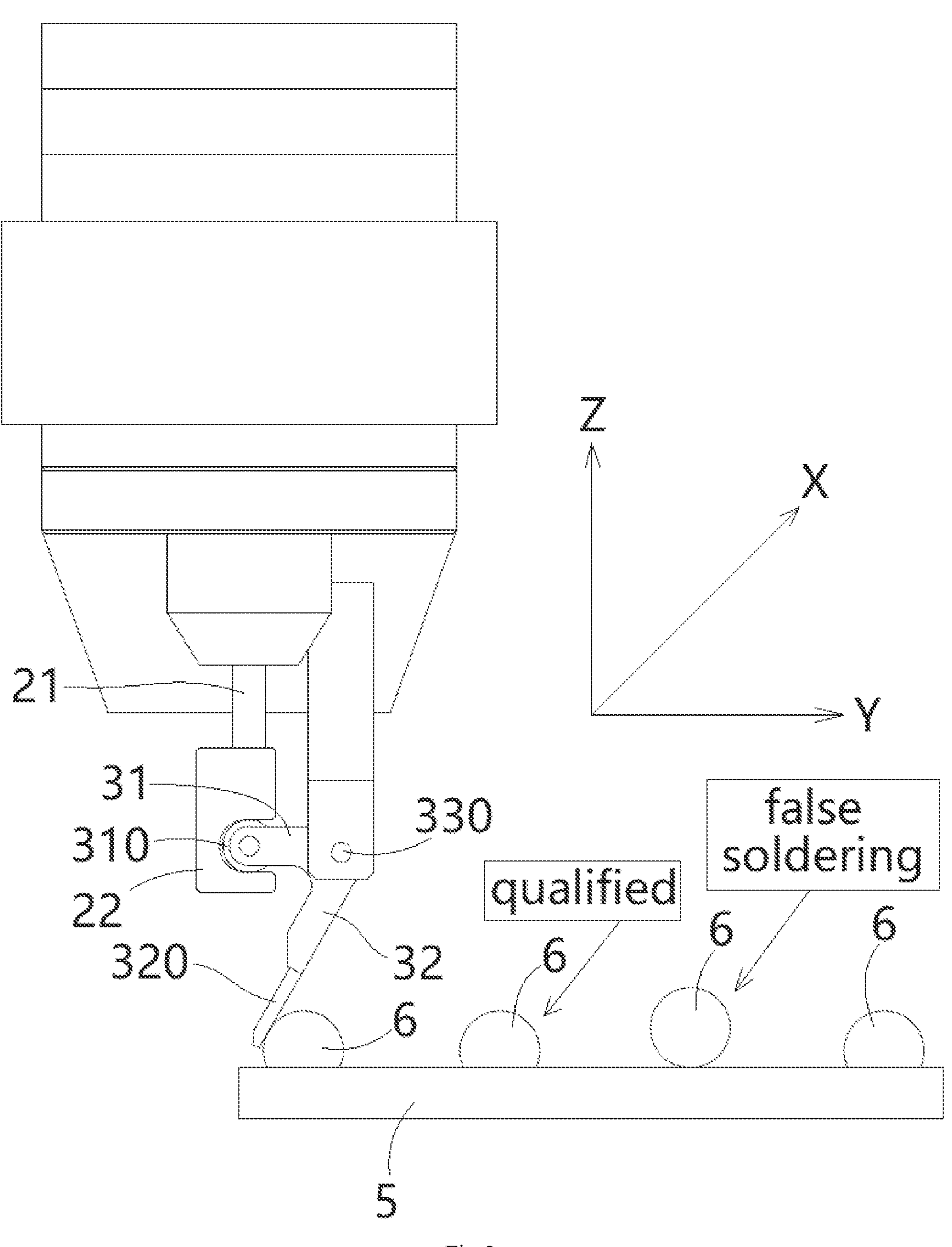
FIG. 3 is a plan view of a detection device according to an exemplary embodiment of the present invention, wherein the contact probe is just in contact with the second component.
Figure 4:
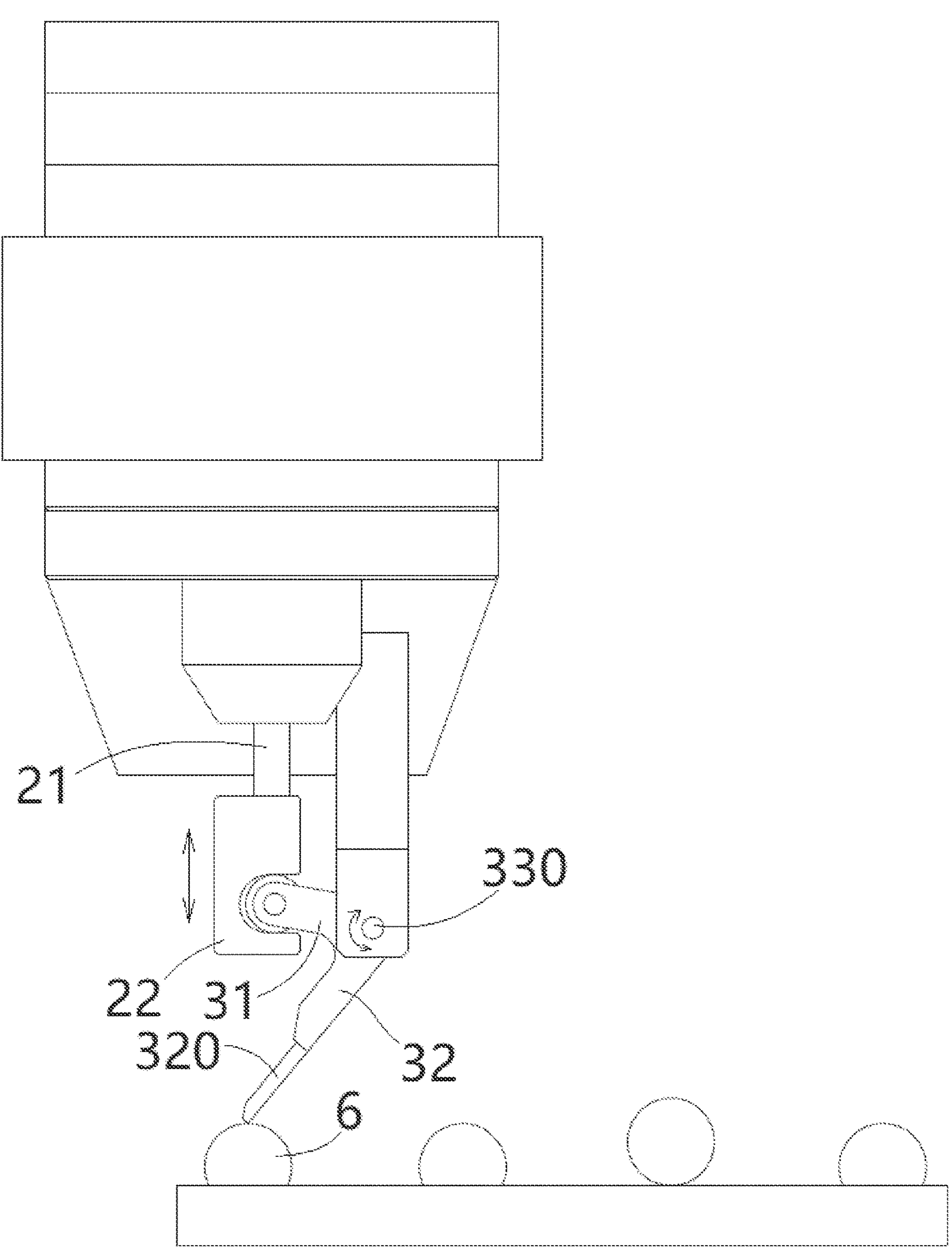
FIG. 4 is a plan view of a detection device according to an exemplary embodiment of the present invention, wherein the contact probe moves to the top of the second component.
Figure 5:
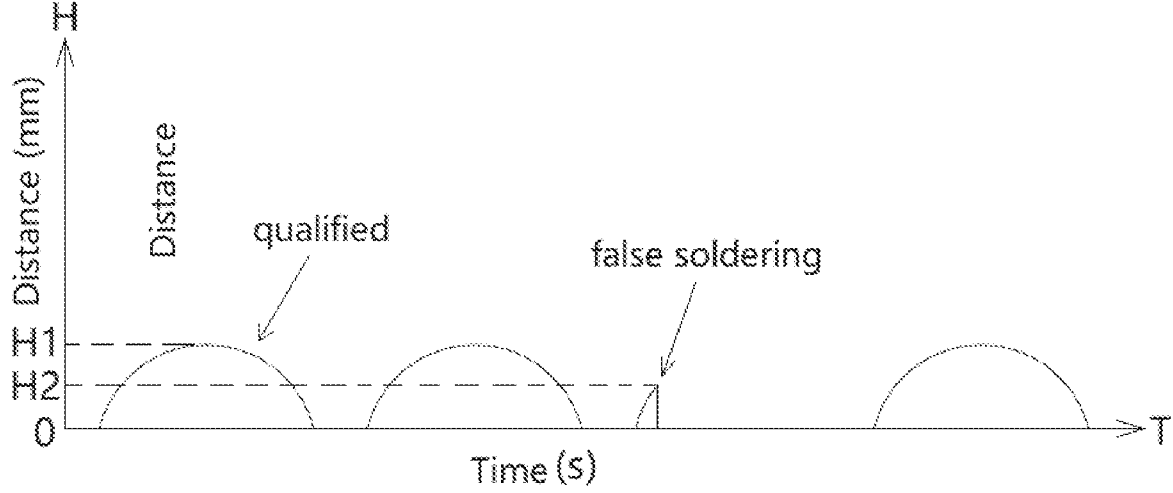
FIG. 5 is a graph illustrating a relationship between the movement distance and time of the moving assembly of the detection device according to an exemplary embodiment of the present invention.

FIG. 1 is an illustrative perspective view of a detection device 100 according to an exemplary embodiment of the present invention. FIG. 2 is a plan view of the detection device 100 according to an exemplary embodiment of the present invention. FIG. 3 is a plan view of the detection device 100 according to an exemplary embodiment of the present invention, wherein a contact probe 320 is in contact with a second component 6. FIG. 4 is a plan view of the detection device 100 according to an exemplary embodiment of the present invention, wherein the contact probe 320 is moved to the top of the second component 6. FIG. 5 shows a relationship between the movement distance and time T of a moving assembly 2 of the detection device 100 according to an exemplary embodiment of the present invention.

In an exemplary embodiment of the present disclosure, the detection device 100 is adapted to check welding quality, for example, to check for the presence of solder defects. The detection device 100 includes a housing 1, the moving assembly 2, a mounting bracket 11, and a rotating assembly 3. The moving assembly 2 is movably installed on the housing 1 and can be moved up and down in the vertical direction Z. The mounting bracket 11 is fixed onto the housing 1. The rotating assembly 3 is rotatably mounted to the mounting bracket 11.

The rotating assembly 3 includes a rotating member 31, 32 and the contact probe 320. The rotating member 31, 32 is rotatably connected to the mounting bracket 11 and movably connected to the moving assembly 2. The contact probe 320 is fixed to the rotating member 31, 32 for sliding contact with the second component 6 welded on the first component 5 and pushing the moving assembly 2 in the vertical direction Z through the rotating member.

The rotating member 31, 32 includes a first rotating arm 31 and a second rotating arm 32. One end of the first rotating arm 31 is movably connected to the moving assembly 2. One end of the second rotating arm 32 is connected to the other end of the first rotating arm 31. A connecting part between the first rotating arm 31 and the second rotating arm 32 is rotatably connected to the mounting bracket 11, enabling the first rotating arm and the second rotating arm to rotate around a horizontal axis extending along a first horizontal direction X. The contact probe 320 is fixed to the other end of the second rotating arm 32.

During checking of the welding quality of the second component 6, the detection device 100 moves in the second horizontal direction Y perpendicular to the first horizontal direction X, so that the contact probe 320 slides into contact with the second component 6. When the welding quality of the inspected second component 6 is qualified, the contact probe 320 slides along the outer surface of the second component and drives the moving assembly 2 to move a predetermined distance H1 in the vertical direction Z through the first rotating arm 31 and the second rotating arm 32. When the welding quality of the inspected second component 6 is unqualified, the second component 6 will detach from the first component 5 under the push of the contact probe 320, resulting in the movement distance H2 of the moving assembly 2 along the vertical direction Z being less than the predetermined distance H1. Therefore, in the illustrated embodiment, it is possible to determine whether the welding quality of the second component 6 being inspected is qualified based on the movement distance of the moving assembly 2 in the vertical direction Z, that is, whether there is a faulty welding problem.

The moving assembly 2 includes a moving rod 21 and a moving block 22. The moving rod 21 is slidably installed in a mounting hole on the housing 1. The moving block 22 is connected to the lower end of the moving rod 21. The moving block 22 is movably connected to one end of the first rotating arm 31. In the illustrated embodiment, the moving block 22 has a certain predetermined weight to apply a certain rotational torque to the first rotating arm 31. The contact probe 320 needs to overcome this rotational torque in order to push the moving assembly 2 upwards in the vertical direction Z.

A sliding slot 221 extending horizontally is formed on the moving block 22. The rotating assembly 3 also includes a roller 310 installed in the sliding slot 221, which is rotatably connected to one end of the first rotating arm 31. This enables the first rotating arm 31 to move along the sliding slot 221 relative to the moving block 22. However, the present invention is not limited to the illustrated embodiments. For example, in another exemplary embodiment of the present invention, a sliding slot 221 extending horizontally is formed on the moving block 22, and the rotating assembly 3 also includes a slider that is slidably installed in the sliding slot. The slider is rotatably connected to one end of the first rotating arm 31, enabling the first rotating arm to move along the sliding slot 221 relative to the moving block 22.

A positioning flange 21*a* is formed at the upper end of the moving rod 21, which is adapted to abut against a positioning step 10*a* inside the housing 1 to position the moving assembly 2 and the rotating assembly 3 at an initial position. When the moving assembly 2 and the rotating assembly 3 are in the initial position, the movement distance of moving assembly in the vertical direction Z is zero, and the rotation angle of rotating assembly around the horizontal axis is also zero.

The first rotating arm 31 extends a first length R1 along its length direction. The total extension length of the second rotating arm 32 and the contact probe 320 along its length direction is equal to a second length R2. The second length R2 is greater than the first length R1, and the angle θ between the first rotating arm 31 and the second rotating arm 32 is greater than zero degrees and less than 90 degrees. The length of the contact probe 320 is adjustable, so that the second length R2 and the movement distance of the moving assembly 2 in the vertical direction Z are adjustable by adjusting the length of the contact probe. In this way, the sensitivity of the detection device 100 can be conveniently adjusted to be suitable for inspecting different welding products.

The contact probe 320 is detachably installed on the second rotating arm 32. As a result, the second length R2 and the movement distance of the moving assembly 2 in the vertical direction Z are capable of being changed by replacing the contact probe. In this way, the sensitivity of the detection device 100 can be conveniently adjusted to be suitable for inspecting different welding products.

The rotating member 31, 32 are detachably connected to the mounting bracket 11. Resultingly, the movement distance of the moving assembly 2 in the vertical direction Z and at least one of the first length R1, the second length R2, and the angle θ are capable of being changed by replacing the rotating member 31, 32. In this way, the sensitivity of the detection device 100 can be conveniently adjusted to be suitable for inspecting different welding products. The rotating assembly 3 further includes a pivot shaft 330, which is fixed to the rotating member 31, 32 and rotatably installed on the mounting bracket 11. This enables the rotating member 31, 32 to rotate around the horizontal axis.

The detection device 100 also includes a sensor 4, which is installed in the housing 1 to detect the movement distance of the moving assembly 2 in the vertical direction Z. The sensor 4 is used to communicate and connect with a welding quality judgment device. The judgment device may be embodied as part of the sensor 4, as shown in FIG. 2, as a functional module composed of software and hardware running on a computer, and to transmit the detected movement distance to the welding quality judgment device. More specifically, the judgment device 4 may include a processor and a memory device. The memory device stores instructions that, when executed by the processor, perform the function of the judgment device described herein. The aforementioned sensor 4 can be a laser distance sensor or an ultrasonic distance sensor.

In another exemplary embodiment of the present invention, a welding quality inspection system is also disclosed. The welding quality inspection system includes the aforementioned detection device 100 and the welding quality judgment device. The welding quality judgment device is used to determine whether the welding quality of the second component 6 welded on the first component 5 is qualified based on the movement distance of component 2 in the vertical direction Z.

In addition, those areas in which it is believed that those of ordinary skill in the art are familiar, have not been described herein in order not to unnecessarily obscure the invention described. Accordingly, it has to be understood that the invention is not to be limited by the specific illustrative embodiments, but only by the scope of the appended claims.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word “a” or “an” should be understood as not excluding plural of the elements or steps, unless such exclusion is explicitly stated. Furthermore, references to “one embodiment” of the present disclosure are not intended to be interpreted as excluding the existence of additional embodiments that also incorporate the recited features. Moreover, unless explicitly stated to the contrary, embodiments “comprising” or “having” an element or a plurality of elements having a particular property may include additional such elements not having that property.

What is claimed is:

1. A detection device adapted to determine welding quality, comprising:

- a housing;
- a moving assembly arranged on the housing and movable vertically relative to the housing;
- a mounting bracket fixed to the housing; and
- a rotating assembly, including:
  - a rotating member rotatably connected to the mounting bracket and movably connected to the moving assembly; and
  - a contact probe fixed to the rotating member and adapted to slidingly contact a second component welded on a first component and to push the moving assembly to move a movement distance in the vertical direction through the rotating member.

2. The detection device according to claim 1, wherein the rotating member includes:

- a first rotating arm having a first end movably connected to the moving assembly; and
- a second rotating arm having a first end connected to a second end of the first rotating arm, wherein:
  - a connecting part between the first rotating arm and the second rotating arm is rotatably connected to the mounting bracket such that the first rotating arm and the second rotating arm are rotatable around a horizontal axis extending along a first horizontal direction; and
  - the contact probe is fixed to a second end of the second rotating arm.

3. The detection device according to claim 2, wherein during operation, the detection device moves in a second horizontal direction perpendicular to the first horizontal direction, and the contact probe is adapted to slide in contact with the second component.

4. The detection device according to claim 3, wherein when the welding quality of the inspected second component is qualified, the contact probe slides along the outer surface of the second component and drives the moving assembly to move a predetermined distance in the vertical direction through the first rotating arm and the second rotating arm.

5. The detection device according to claim 4, wherein when the welding quality of the inspected second component is unqualified, the second component will detach from the first component under a bias of the contact probe, resulting in the movement distance of the moving assembly along the vertical direction being less than the predetermined distance.

6. The detection device according to claim 2, wherein the moving assembly includes:

- a moving rod slidably arranged in a mounting hole of the housing; and
- a moving block connected to a lower end of the moving rod and movably connected the first end of the first rotating arm.

7. The detection device according to claim 6, wherein:

- a sliding slot extending horizontally is formed in the moving block, the rotating assembly including a roller installed in the sliding slot in a rolling manner; and
- the roller is rotatably connected to the first end of the first rotating arm such that the first rotating arm is movable along the sliding slot relative to the moving block.

8. The detection device according to claim 6, wherein a sliding slot extending horizontally is formed in the moving block, and the rotating assembly includes a slider that is slidably installed in the sliding slot.

9. The detection device according to claim 8, wherein the slider is rotatably connected to the first end of the first rotating arm such that the first rotating arm is movable along the sliding slot relative to the moving block.

10. The detection device according to claim 6, wherein a positioning flange is formed at the upper end of the moving rod and is adapted to abut against a positioning step inside the housing to position the moving assembly and the rotating assembly in an initial position.

11. The detection device according to claim 10, wherein when the moving assembly and the rotating assembly are in the initial position, the movement distance of the moving assembly in the vertical direction is zero, and the rotation angle of the rotating assembly around the horizontal axis is zero.

12. The detection device according to claim 2, wherein the first rotating arm extends a first length along its length direction, and a total extension length of the second rotating arm and the contact probe along the length direction of the second rotating arm is equal to a second length.

13. The detection device according to claim 12, wherein the second length is greater than the first length, and an angle between the first rotating arm and the second rotating arm is greater than zero degrees and less than 90 degrees.

14. The detection device according to claim 13, wherein a length of the contact probe is adjustable such that the second length and the movement distance of the moving assembly in the vertical direction are adjustable.

15. The detection device according to claim 13, wherein the contact probe is detachably installed on the second rotating arm such that the second length and the movement distance of the moving assembly in the vertical direction are capable of being changed by replacing the contact probe.

16. The detection device according to claim 13, wherein the rotating member is detachably connected to the mounting bracket such that the movement distance of the moving assembly in the vertical direction and at least one of the first length, the second length and the angle are changeable by replacing the rotating member.

17. The detection device according to claim 13, wherein the rotating assembly further includes a pivot shaft fixed to the rotating member and rotatably installed on the mounting bracket such that the rotating member is rotatable around the horizontal axis.

18. The detection device according to claim 1, further comprises a sensor installed in the housing and adapted to detect the movement distance of the moving assembly along the vertical direction, wherein the sensor is communication with a welding quality judgment device for transmitting the detected movement distance to the welding quality judgment device.

19. The detection device according to claim 18, wherein the sensor is a laser distance sensor or an ultrasonic distance sensor.

20. A welding quality inspection system, comprising:

a detection device, including:

a housing;

a moving assembly arranged on the housing and adapted to be movable vertically relative to the housing;

a mounting bracket fixed to the housing; and a rotating assembly, including:

a rotating member rotatably connected to the mounting bracket and movably connected to the moving assembly; and a contact probe fixed to the rotating member and adapted to slidingly contact a second component welded on a first component and to push the moving assembly to move in the vertical direction through the rotating member; and a welding quality judgment device adapted to determine whether the welding quality of a second component welded on a first component is qualified based on a movement distance of the moving assembly in the vertical direction.

* * * * *